United States Patent [19]

Johnson

[11] 4,198,029
[45] Apr. 15, 1980

[54] THROTTLING CONTROL VALVE

[75] Inventor: Dwight N. Johnson, El Toro, Calif.

[73] Assignee: Textron, Inc., Providence, R.I.

[21] Appl. No.: 730,962

[22] Filed: Oct. 8, 1976

[51] Int. Cl.² ........................................... F16K 31/126
[52] U.S. Cl. .................................. 251/61.1; 137/219; 251/DIG. 2
[58] Field of Search .................. 137/219, 220, 625.28, 137/625.3; 251/DIG. 2, 5, 25, 61.1, 61.2, 46; 92/98 D, 99, 100, 96

[56] References Cited

U.S. PATENT DOCUMENTS

| | | | |
|---|---|---|---|
| 2,267,218 | 12/1941 | Reinecke | 92/96 |
| 2,545,857 | 3/1951 | Perkins et al. | 92/98 R |
| 2,556,596 | 6/1951 | Perkins et al. | 92/98 R |
| 2,572,175 | 10/1951 | McPherson | 251/61.1 |
| 2,650,607 | 9/1953 | Bryant | 251/5 |
| 2,781,051 | 2/1957 | Hawley | 251/61.1 |
| 2,838,269 | 6/1958 | Hunter et al. | 251/61.1 |
| 2,868,492 | 1/1959 | Volcov et al. | 251/46 |
| 3,038,488 | 6/1962 | Welch et al. | 251/61.1 |
| 3,212,768 | 10/1965 | Casimir | 92/98 R |
| 3,387,630 | 6/1968 | Routson | 137/625.3 |
| 3,523,857 | 8/1970 | Crosland | 92/96 |
| 3,574,310 | 4/1971 | Souriau | 251/61.1 |
| 3,690,344 | 9/1972 | Brumm | 251/5 |
| 3,836,113 | 9/1974 | Johnson | 251/5 |

FOREIGN PATENT DOCUMENTS 1913355 10/1969 Fed. Rep. of Germany ......... 251/61.1

*Primary Examiner*—Martin P. Schwadron
*Assistant Examiner*—G. L. Walton
*Attorney, Agent, or Firm*—Fitch, Even & Tabin

[57] ABSTRACT

A servo operated throttling control valve for controlling fluid flow in a fluid system such as a pipe line includes a body defining an internal chamber in fluid communication with an inlet and an outlet fabricated in the body. The valve further includes a deformable valve element mounted within the chamber that, in the valve closed position, seats against a valve seat and a rib grill defined in the chamber. The valve element and the body define a control chamber adapted to be coupled to a source of control pressure. The configuration of the body is fluted to accommodate bolt patterns employed in different flange ratings.

5 Claims, 5 Drawing Figures

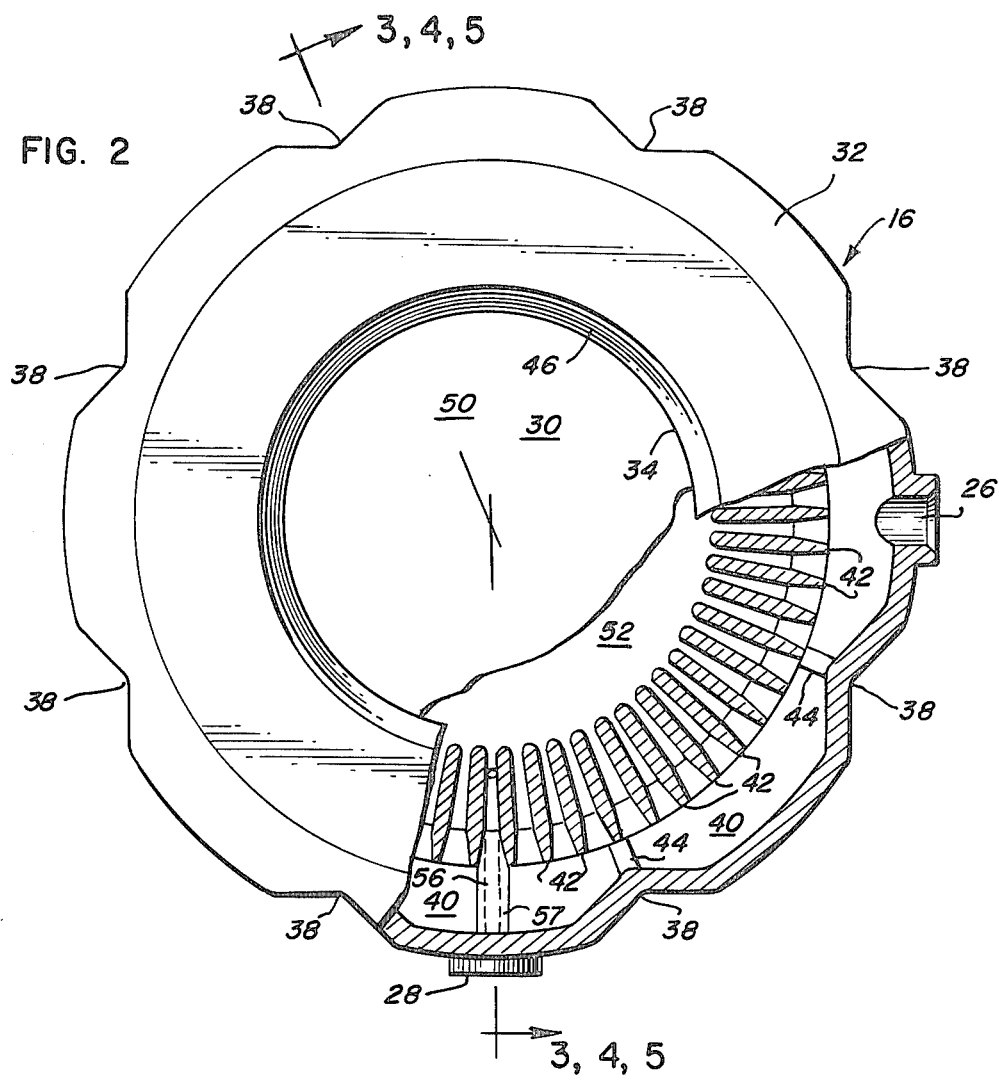
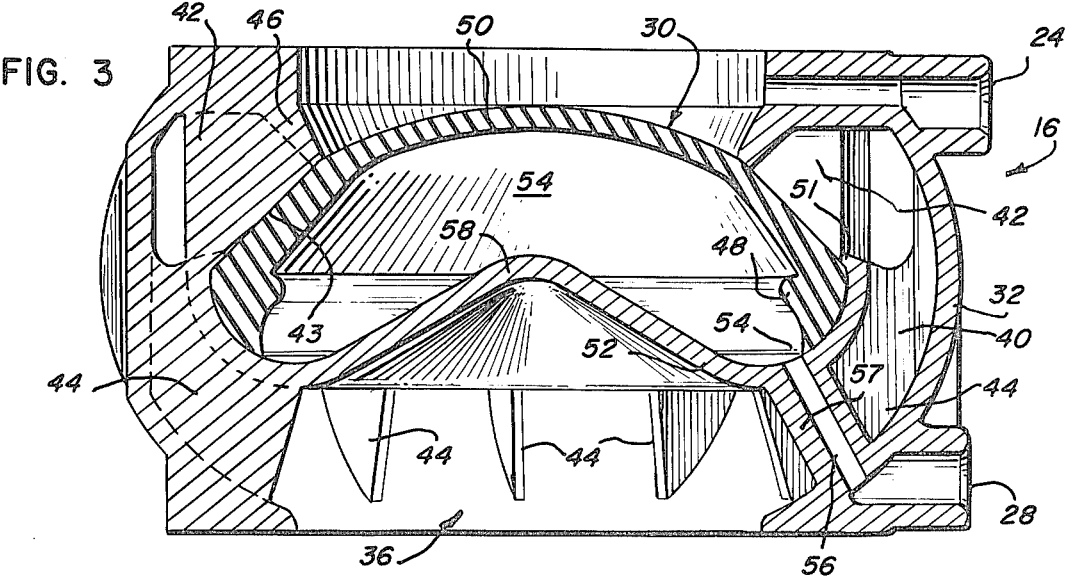

THROTTLING CONTROL VALVE

BACKGROUND OF THE INVENTION

A. Field of the Invention

The present invention relates to a new and improved servo-operated throttling control valve employed in liquid and gas flow control applications.

B. Description of the Prior Art

Fluid flow through fluid systems such as a pipe line is typically controlled by a throttling valve including one or more elastomeric expansion elements. The elastomeric elements are biased against one or more ports by control pressure. Opening of the valve is accomplished by reducing the magnitude of the control pressure a sufficient amount below the inlet pressure to allow the upstream fluid pressure to open or expand the elastomeric element away from the ports. This action allows flow through the valve. If the control pressure is further reduced, the valve is further opened thereby increasing the flow through the valve. Flow through the valve may be reduced or terminated by increasing the control pressure to bias the element over all of the ports. A typical expansion element, servo-operated throttling valve is disclosed in U.S. Pat. No. 3,690,344.

Prior art throttling valves typically include a body having a plurality of components resulting in substantial manufacturing costs, a bulky design, and a substantial number of potential leak paths. In addition, prior art throttling valves having an elastomeric expansion element operate by stretching or expanding the element to open the valve. For example, some prior art valves circumferentially stretch the element as much as thirty percent when the valve is fully open. This causes loss of memory of the elastomeric material. Moreover, since the element is physically stretched or expanded for valve opening, substantial lowering of the control pressure is required to achieve full valve opening.

Typical prior art valves are of the wafer type and may be mounted between a pair of pipe flanges in a pipe line. These prior art valves have a cylindrical body sized to fit within a given flange bolt pattern. When the valve is employed in a pipe line having a different flange rating, a different flange bolt pattern must be accommodated. This requires centering devices such as centering tubes or collars to be installed on the bolt studs in order to allow the prior art valve to be employed.

A further element included in prior art expansion element valves is an upstream grill. In these prior art valves fluid flows through the upstream grill prior to entering the throttling region of the valve as defined by the expansion element. When the prior art valve is fully opened, a fluid pressure loss and a resultant velocity increase occurs across the grill. This high velocity fluid flow directly impinges upon the expansion element causing severe erosion due to high pressure, high flow and entrained sand. This severe erosion of the element results in increased service down time and cost. Moreover, the pressure loss results in the necessity to lower the loading pressure substantially in order to obtain full opening of the valve.

In addition, many of the prior art expansion element valves exhibit a high velocity discharge jet in the downstream piping. To correct this high velocity jet, a substantial length of downstream piping is required for the discharge flow to revert from the kinetic to a higher static pressure.

SUMMARY OF THE INVENTION

An object of the present invention is to provide a new and improved servo-operated throttling control valve for use in fluid flow control applications.

Another object of the present invention is to provide a new and improved throttling control valve including only two components providing manufacturing economy and a compact design.

A further object of the present invention is to provide a new and improved throttling control valve that employs a deformable elastomeric lining operable in a rolling fashion to throttle the valve.

An additional object of the present invention is to provide a new and improved throttling control valve including a body having a configuration that is adaptable to fluid systems having different flange ratings without the employment of centering devices.

Briefly, the present invention relates to a new and improved servo-operated, throttling control device or valve that may be employed to control fluid flow through a fluid system such as a gas or liquid pipe line. The valve includes an integral, one-piece body defining an interior chamber or cavity and having an inlet and outlet in fluid communication with the cavity. The body further includes an integral portion of the body adjacent to which is mounted an elastomeric, deformable valve element. The element in the valve closed position seals against a seat defined within the body and also seals against a grill that defines a plurality of flow paths through the body.

A control pressure chamber is defined between the portion of the body and the element and is in fluid communication with a source of control pressure through a port defined within the body. The sealing of the element against the seat and the grill is controlled by the control pressure thereby throttling the valve.

The body has a fluted configuration such that it is adaptable to systems including different flange bolt patterns.

BRIEF DESCRIPTION OF THE DRAWINGS

The present invention together with the above and other objects and advantages will best appear from the following detailed description of an illustrative embodiment of the invention shown in the accompanying drawings, wherein:

FIG. 2 is a horizontal view, partly in section, of a throttling control valve constructed in accordance with the present invention;

FIG. 3 is a cross sectional view of the throttling control valve, in a valve closed position, taken along line 3—3 of FIG. 2;

DETAILED DESCRIPTION OF THE PREFERRED EMBODIMENT

Figure 1:
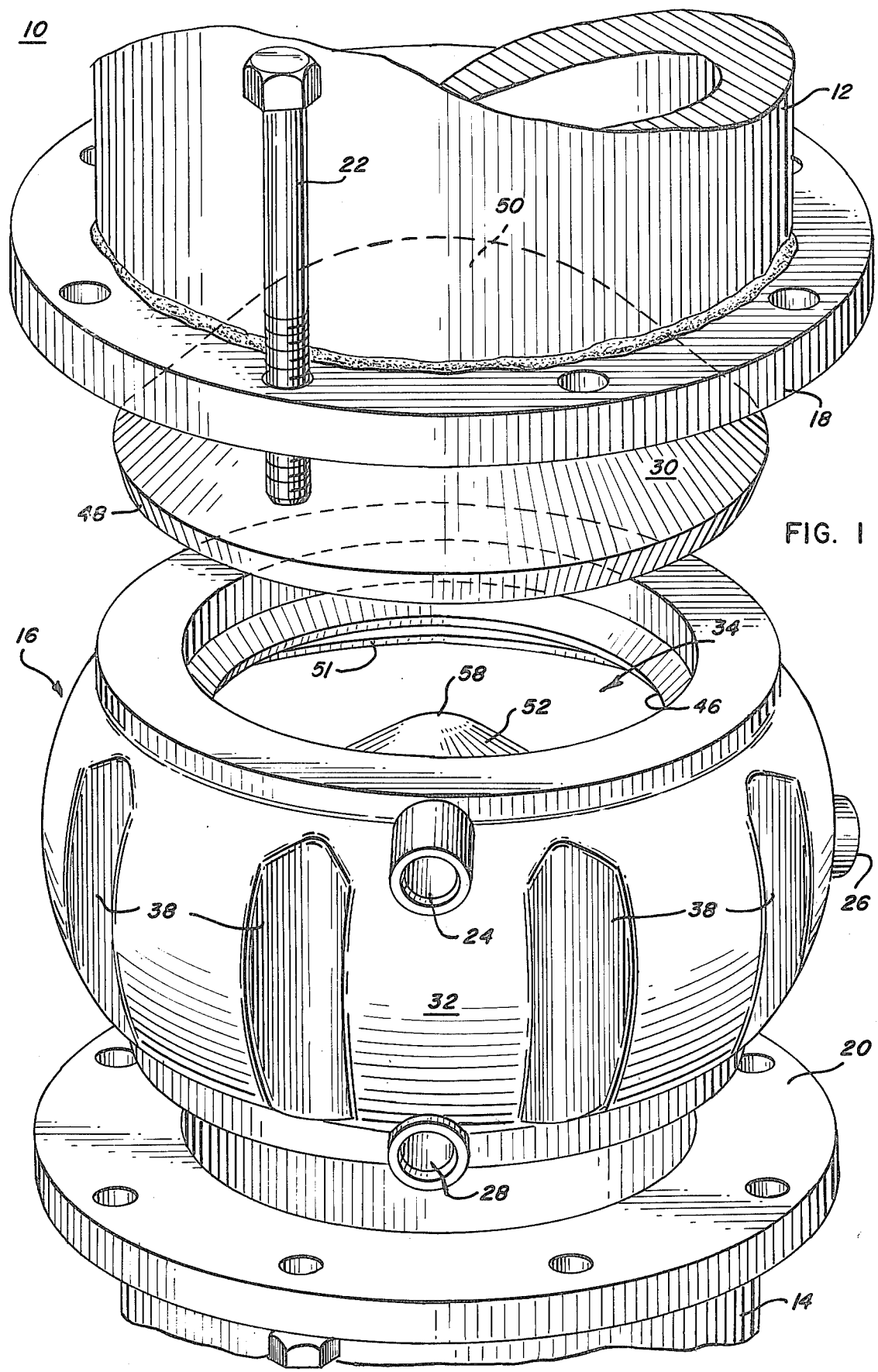
FIG. 1 is an exploded perspective view of a segment of a fluid pipe line incorporating a throttling control valve constructed in accordance with the present invention.

Having reference now to the drawings, and initially to FIG. 1, there is illustrated a portion of a fluid pipe line system designated as a whole by the reference numeral 10 including pipes 12 and 14 and a throttling control valve generally designated by the numeral 16 that is employed to control the flow of liquid or gas through the pipe line system 10. The valve 16 is a wafer-type valve that is mounted between the flanges 18 and 20 of the pipes 12 and 14 in a manner substantially equivalent to a thick gasket. Once the valve 16 is positioned between the flanges 18 and 20, the pipes 12 and 14 are jointed together by several bolt fasteners 22.

Opening and closing of the valve 16 is controlled by application of control pressure to a control port 28. In a typical installation, an external regulator (not shown) is coupled to the valve 16 to sense fluid pressures upstream or downstream of the valve 16 and to vary the control pressure communicated to the valve 16. The regulator is interconnected with the valve 16 by means of a port 24, a port 26, and the control port 28 fabricated in the valve 16. My copending U.S. Pat. No. 4,083,375, filed Feb. 18, 1976, entitled Pilot Regulator, describes how the regulator may be employed to control the operation of the valve 16, and is incorporated herein by reference.

The valve 16 is a deformable or roll type valve employing a deformable, elastomeric diaphragm or liner 30. The diaphragm 30 is actuated by upstream pressure as control or loading pressure introduced into control port 28 is varied and deforms or rolls within the valve 16 to control fluid flow. The diaphragm 30 is not stretched or expanded to provide valve opening and thus avoids the disadvantage of loss of "memory" of the elastomeric material that often results in malfuntioning of the valves employing an expansion element.

More specifically, the valve 16 consists of two parts: a one-piece body or housing 32, and the diaphragm or liner 30. The valve housing 32 includes an inlet 34 and an outlet 36 and, as previously mentioned, the valve 16 is intended to be mounted between the flanges 18 and 20 of the pipes 12 and 14 such that the inlet 34 and outlet 36 are centered with the pipes 12 and 14 and in line with the fluid flow. To allow the valve 16 to be employed between flanges having different load ratings, each including a different pattern of fasteners 22, the housing 32 is fluted to include a plurality of grooves 38 on its outer periphery. In this manner, each of the fasteners 22 employed in, for example, a four inch line with a 150 lb. flange bolt pattern will nest within a groove 38, thereby accurately centering the valve. The enclarged diameter regions 40 between the grooves 38 provide increased flow capacity as compared with prior art wafer valves designed for use with a 150 lb. bolt circle.

The valve 16 may also be employed in a system including pipes 12 and 14 requiring a different fastener pattern such as a 300 lb. flange bolt pattern. In this pattern, the fasteners 22 lie in a circle larger than the 150 lb. bolt circle, and the housing 32 is centered within this larger pattern. For example, the individual fasteners 22 can engage the housing 32 in the circular cylindrical regions between the grooves 38 thus to center the housing. Alternatively, if the bolt circle is not large enough to enclose the major diameter of the housing, the housing 32 can be rotated so that the bolts 32 are cammed against the sloping sides of grooves 38 in order to center the housing. Accordingly, the same valve 16 can accommodate different systems 10 having different flange ratings with different numbers of bolts 22 and differenet bolt circle sizes. The valve is centered within the pattern of the fasteners without the necessity for centering tubes or collars such as used in the past.

Fluid flows through the valve 16 along a plurality of flow paths 40 defined between the grooves 38 of the fluted housing 32. Support ribs 44 extend inwardly from grooves 38 and are positioned between the regions 40. A plurality of ribs 42 integrally formed within the housing 32 define a generally frusto-conical grill or valving surface 43 and also define a plurality of slots or ports between the ribs 42. The housing 32 also includes a valve seat 46 defined adjacent the inlet 34 and adjacent the grill 43 such that fluid entering the inlet 34 flows over the integral valve seat 46, between the ribs 42, through the regions 40, and through the outlet 36.

Flow through the valve 16 is controlled by the interaction of the diaphragm 30 with the valve seat 46 and the ribs 42. More specifically, the diaphragm 30 is of a generally parabolic or concavo-convex configuration including a peripheral edge 48 and an intermediate or central portion 50. To assemble the valve 16, the diaphragm 30 is inserted into the valve 16 through the inlet 34 until the edge 48 seats within a lip 51 of a cone-shaped control chamber wall or baffle 52 integrally formed within the housing 32. Once the diaphragm 30 is mounted within the valve housing 32, the intermediate portion 50 of the diaphragm 30 seals against the seat 46 and the ribs 42 in the valve closed position. A control pressure chamber 54 is defined between the wall or baffle 52 and the inner peripheral surface of the diaphragm 30.

Once fluid flow is introduced into the system 10, the valve 16 is opened by a rolling action of the diaphragm 30 off of the seat 46 and the ribs 42 in response to upstream pressure at the inlet 34. Control of the position of the diaphragm 30 relative to the seat 46 and the ribs 42 is provided by varying a control or loading pressure within the chamber 54. The chamber 54 is coupled to a source of control pressure through a conduit 56 defined within an integral strut 57 that is in fluid communication with the control port 28. In this manner, the magnitude of fluid pressure in the control chamber 54 is varied by an outside source, such as the regulator described in my U.S. Pat. No. 4,083,375.

In the valve closed position (FIG. 3), the control or loading pressure in the chamber 54 is equal to the upstream pressure in the system 10. The loading pressure presses the intermediate portion 50 of the diaphragm 30 against the surrounding ribs 42 and the seat 46. The valve seat 46 is fabricated such that it projects slightly (not shown) from the plane of grill 43 to allow the seat 46 to extend into the material of the diaphragm 30 farther than the ribs 42, thereby concentrating the sealing force on the seat 46 and assuring positive shut off. With inlet pressure applied in both the inlet 34 and the chamber 54, the valve is clamped shut because the area of the control chamber is larger than the area circumscribed by valve seat 46.

Figure 4:
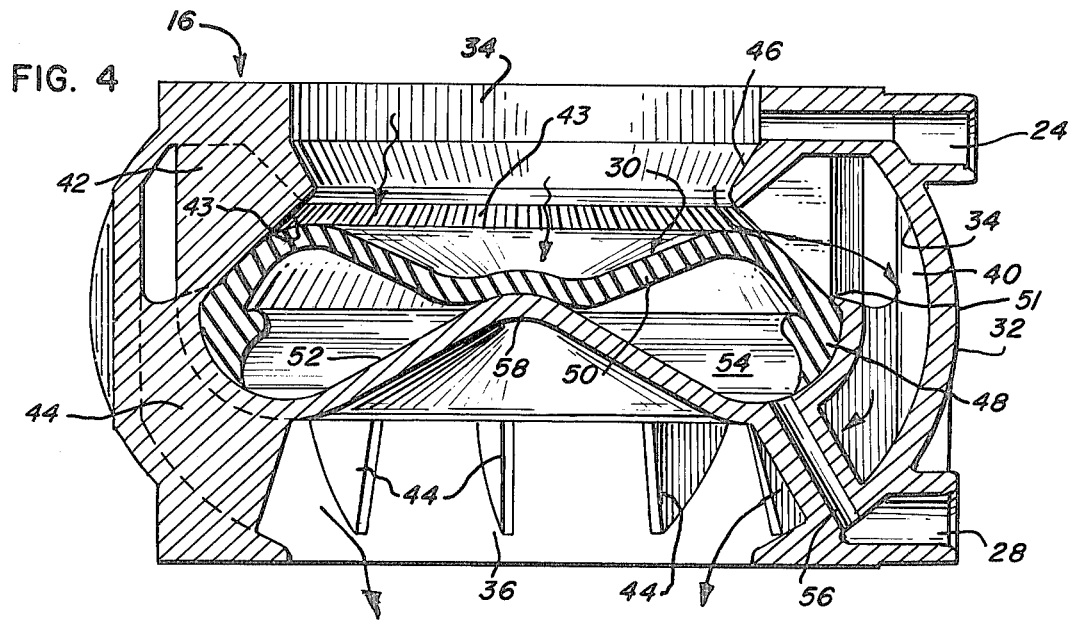
FIG. 4 is a cross sectional view of the throttling control valve in a partially open position taken along line 4—4 of FIG. 2.

If the conditions downstream of the valve 16 require valve opening due to, for example, a demand for fluid; the control pressure in the cavity 54 is lowered relative to the inlet pressure and the diaphragm 30 is deformed into a partial valve open position as a result of the pressure differential between the upstream and control pressures across the diaphragm 30 (FIG. 4). As this occurs, the central portion 50 of the diaphragm 30 inverts and comes to rest upon the tip 58 of the chamber wall 52.

More specifically, if, for example, upstream pressure were 300 psi. and downstream pressure were 50 psi.; the control pressure would be 300 psi. in the valve closed position. To commence opening the valve 16, the control pressure may be reduced to, for example, 290 psi. The pressure differential of 10 psi. across the unsupported portion of the diaphragm 30 (that portion not sealed against the seat 46 and ribs 42) results in a rolling force equal to the area of the unsupported portion times the pressure differential of 10 psi. The force inverts the unsupported portion causing it to drape over the tip 58. That portion of the diaphragm that is in contact with the tip 58 no longer has the control pressure acting against it, thus reducing the area of the unsupported portion of the diaphragm 30. There is also a clamping force equal to the pressure differential of 240 psi. (control pressure less downstream pressure) times the area of the supported portion of the diaphragm 30 (that portion sealing the diaphragm against the seat 46 and the ribs 42) clamping the supported portion against the seat 46 and the ribs 42.

The difference in the rolling and clamping forces tends to roll the diaphragm 30 off of the seat 46 and the ribs 42 with lowering of control pressure, effecting gradual valve opening. The resultant rolling of the diaphragm 30 relative to the conical rib cage or grill 43 defined by the ribs 42 provides a variable throttling opening of the valve 16.

To open the valve 16 further, the control or loading pressure is further reduced. As this occurs, a greater area of the diaphragm 30 is supported by the wall 52, but the area of the diaphragm 30 supported by the rib cage is simultaneously reduced and the differenece in the rolling and clamping forces causes further rolling of the diaphragm 30. A progressive proportional relationship between liner movement or valve opening and loading pressure is provided by the truncated cone configuration of the grill or valving surface 43 defined by the ribs 42 and by the conical configuration of the wall 52. The conical area and configuration of the wall 52 defines the area of the diaphragm 30 that is unsupported and acted upon by the pressure difference of the upstream and control pressures, thereby determining the magnitude of the force tending to roll the diaphragm 30. The truncated cone configuration of the rib surface 43 defines the area of the diaphragm 30 that is supported by the ribs 42 thereby determining the magnitude of the clamping force. These areas and configurations can be predetermined in order to dictate the proportional decrease in control pressure necessary to open the valve a given incremental amount. In this manner, greater control is available over the initial opening of the valve 16 thereby preventing valve chattering.

Figure 5:
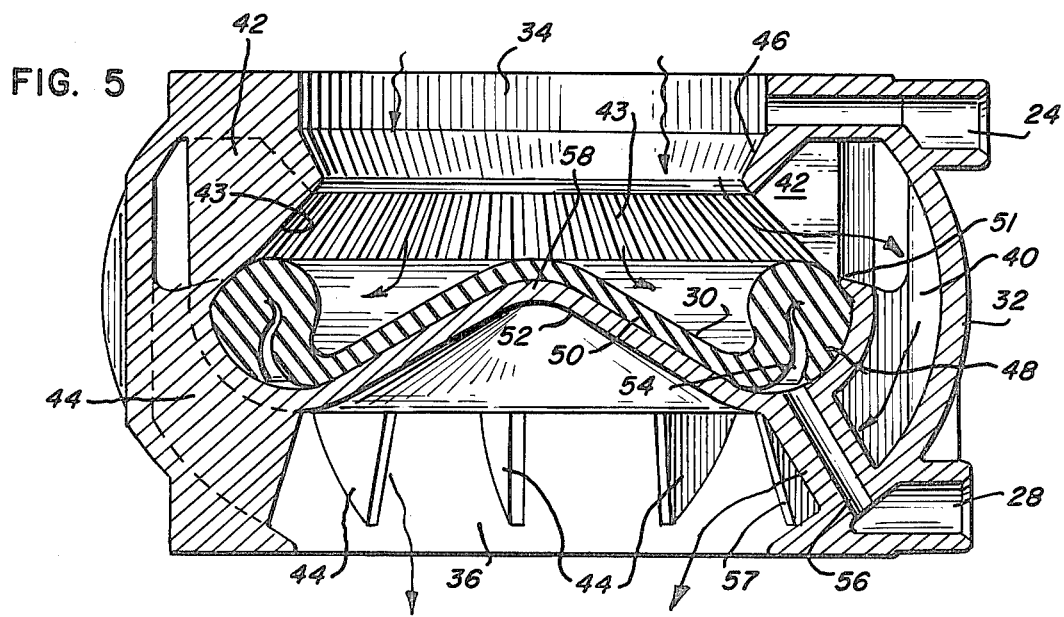
FIG. 5 is a cross sectional view of the throttling control valve in a full open position taken along line 5—5 of FIG. 2.

Full valve opening (FIG. 5) occurs if the chamber 54 is fully vented. Passage 56 remains in communication with chamber 54 in the fully open position. Restoring the control pressure within the chamber 54 to inlet pressure returns the valve 16 to the closed position.

While the invention has been described with reference to details of the illustrated embodiment, it should be understood that such details are not intended to limit the scope of the invention as defined in the following claims.

What is claimed and desired to be secured by Letters Patent of the United States is:

1. A throttling valve for controlling fluid flow through a conduit comprising, in combination:
    a body defining an inlet opening, a substantially coaxial outlet opening, and an interior cavity therebetween,
    a baffle extending transversely across the central portion of the cavity defining an annular passageway between said baffle and the wall of said body for flow of fluid therethrough,
    a plurality of ribs extending from said baffle to the wall of said body to provide a generally frustoconical grill having a plurality of ports therein,
    an elastomeric, concavo-convex liner disposed on the upstream side of said baffle with its peripheral edge in sealing relation therewith so as to define a control chamber between said liner and said baffle,
    means for selectively decreasing and increasing the fluid pressure in said chamber between the pressure existing in said conduit at said inlet opening and pressures therebelow, selective decrease of the pressure in said chamber causing said liner to invert and to roll along said frustoconical grill from a closed position where all of said ports are covered by said liner to positions where progressively greater areas of said ports are exposed, thereby permitting controlled and progressively increasing fluid flow through said ports and through said annular passageway, selective increase of the pressure in said chamber causing reverse movement of said liner,
    said baffle having a central protuberance projecting toward said liner upon which said liner is draped during inversion of said liner.

2. The throttling value of claim 1 wherein the outer surface of the wall of said valve body is fluted to provide self-centering mounting in flange bolt circles of different diameters.

3. The throttling valve of claim 1 further comprising a valve seat upstream from said frustoconical grill against which said concavo-convex liner is seated in its closed position.

4. The throttling valve of claim 1 further comprising support ribs extending radially between said baffle and the wall of said valve body.

5. The throttling valve of claim 4 wherein said valve body, said baffle, said ribs and said ribs comprise a one-piece structure.

* * * * *